United States Patent
Bruderer et al.

(10) Patent No.: US 6,347,702 B1
(45) Date of Patent: *Feb. 19, 2002

(54) SUPPORT FOR A DISC-LIKE INFORMATION HOLDER AND BOARD-LIKE HOLDER WITH SUCH A SUPPORT

(75) Inventors: Marcus Bruderer, Uster; Hans Burkhardt, Zumikon; Hansjörg Dietrich, Immensee; Bruno Leuenberger, Wetzikon, all of (CH)

(73) Assignee: Buchinderei Burkhardt, AG, Monchaltorf (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/400,703

(22) Filed: Sep. 20, 1999

(30) Foreign Application Priority Data

Sep. 18, 1998 (CH) .............................................. 1915/98
Jul. 25, 1999 (CH) .............................................. 1365/99

(51) Int. Cl.[7] .............................................. B65D 85/57
(52) U.S. Cl. ................................... 206/310; 206/308.1
(58) Field of Search ...................... 206/308.1, 309–313, 206/493

(56) References Cited

U.S. PATENT DOCUMENTS

| 5,251,750 | A | * | 10/1993 | Gelardi et al. | 206/310 |
| 5,361,903 | A | * | 11/1994 | Thiele | 206/310 |
| 5,494,156 | A | * | 2/1996 | Nies | 206/310 |
| 5,533,614 | A | * | 7/1996 | Walker | 206/308.1 |
| 5,609,249 | A | * | 3/1997 | Cheng | 206/308.1 |
| 5,685,425 | A | * | 11/1997 | Choi | 206/310 |
| 5,727,680 | A | * | 3/1998 | Liu | 206/308.1 |
| 5,769,217 | A | * | 6/1998 | Derraugh et al. | 206/308.1 |
| 5,816,394 | A | * | 10/1998 | O'Brien et al. | 206/308.1 |
| 5,819,926 | A | * | 10/1998 | O'Brien et al. | 206/308.1 |
| 5,950,822 | A | * | 9/1999 | Cloran et al. | 206/310 |

FOREIGN PATENT DOCUMENTS

| EP | 0198434 | 10/1986 |
| EP | 0238350 | 9/1987 |
| EP | 0384525 | 8/1990 |
| EP | 0300109 | 8/1993 |

* cited by examiner

Primary Examiner—Luan K. Bui
(74) Attorney, Agent, or Firm—James E. Klaniecki; Ann W. Speckman; Janet Sleath

(57) ABSTRACT

A new holder (1) for a disk-shaped information carrier, in particular for a compact disk, is described with a base support (2;21) and clamping elements (3; 17) arranged thereon and integrated therewith which extend into the central opening of the information carrier. The clamping elements (3; 17) in this arrangement are arranged surrounding a central support member (11; 18) and the clamping elements (3; 17) and support element (11; 18) are not higher than twice the thickness of the disk-shaped information carrier. Furthermore a plate-shaped support member (15) for a disk-shaped information carrier, in particular for a compact disk (32), is described which presents a recess in which a holder (1) is arranged which penetrates a central opening of the information carrier (32) detachably connecting the latter to the support member (15). The support member (15) is provided for a plate-shaped-take-up member (25) comprising a front side and a back side and containing a circular opening (27) in which the support member (15) can be fastened. The support member (15) is laid out circular and at its rim (30) is provided with retaining means (35) which engage the circular opening (27) of the take-up member (25) in order to interconnect the two elements.

13 Claims, 4 Drawing Sheets

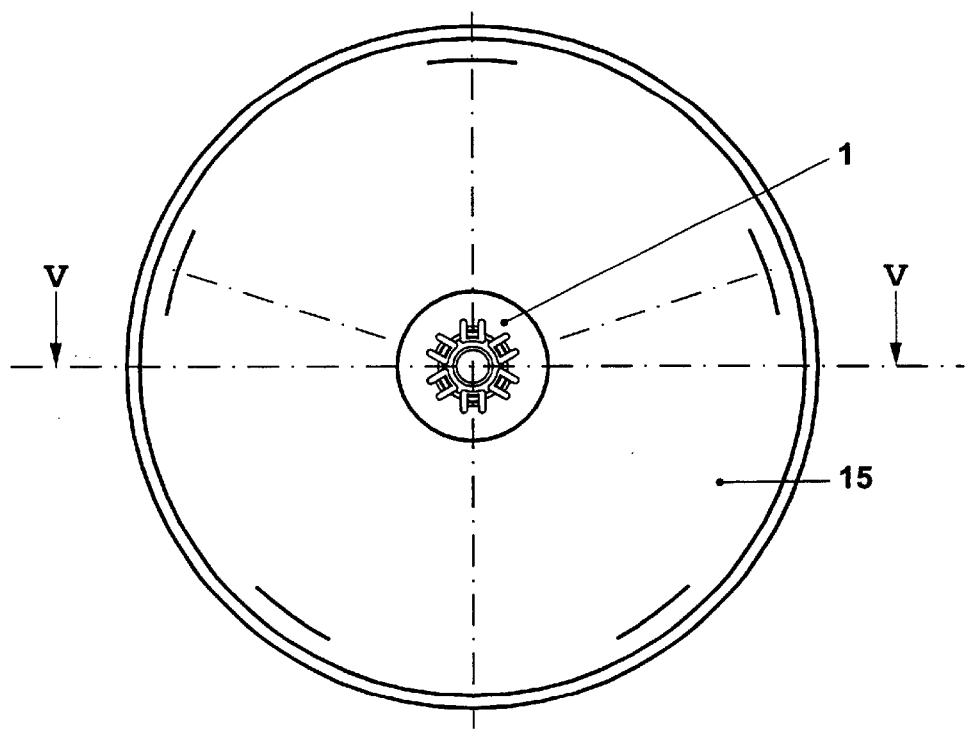
FIG. 4
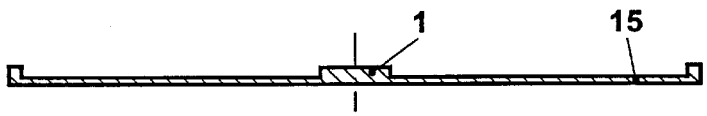
FIG. 5
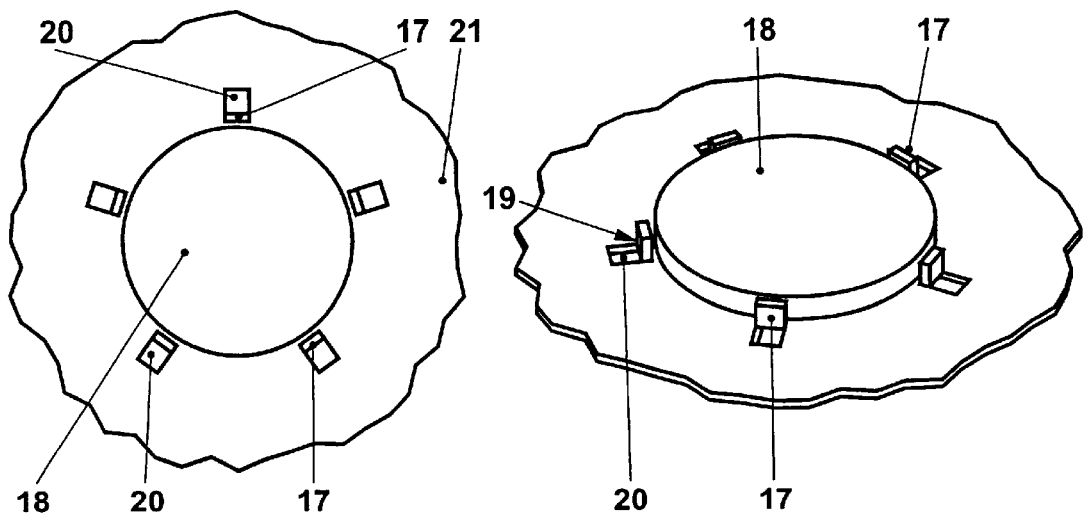
FIG. 6  FIG. 7

SUPPORT FOR A DISC-LIKE INFORMATION HOLDER AND BOARD-LIKE HOLDER WITH SUCH A SUPPORT

CROSS-REFERENCE TO RELATED APPLICATIONS

The present application claims priority to Patent Application CH 1915/98, filed Sep. 18, 1998 and to Patent Application CH 1365/99, filed Jul. 25, 1999.

BACKGROUND OF THE INVENTION

1. Field of the Invention

The present invention concerns a holder and a plate-shaped support member for a disk-shaped information carrier, in particular for a compact disk.

2. Description of the Related Art

For the compact disks (CD) presently in use in large numbers, which serve as audio disks, data carriers and currently also as video data carriers, a great number of storage devices are available. The usual storage device is represented by a flat square recipient to which a tiltable cover is linked. Within the recipient a support member is provided with the contour of the CD and with a centrally arranged holding device. A holding device of this type typically consists of a plurality of Z-shaped tongues which are linked to the support member and are surrounded by cut-outs. Owing to this arrangement the tongues move slightly inwards when pressed down in such a manner that the tongues engage the circular central opening of the CD. The Z-shaped tongues form tapered points and in one variant of the holding device can be provided between rigid fixation devices which also form tapered points. In all known design examples of the holder the z-shaped tongues are at least three times as high as the thickness of the CD in order to ensure correct clamping fixation.

For some time now such CDs also are used as attachments to books, information pamphlets or similar being stored as a rule in a transparent pocket which provides little protection against mechanical deformation of the CD, and a CD inserted in a book can cause deformations with respect to the pages at the margins of the book which are aesthetically not very pleasing.

Furthermore book covers are known formed with a cut-out recess in the cardboard of the cover provided with a deep-drawn plate made from synthetic material on the back side of which four holder extensions protrude laterally and which is inserted into an cut-out opening in the book cover. The extensions arranged on the back side of the book cover are adhesively fastened thereto. The back side of the plate furthermore is covered by a sheet adhesively fastened thereto. In this manner a compact disk can be integrated with the book cover. The thickness of the book cover, however, must be chosen relatively thick in such a manner that the CD does not stick out. For book covers of different thickness furthermore different plates are to be manufactured using a deep drawing process which is comparatively cost intensive and which for smaller numbers of copies to be printed hardly is economically feasible.

BRIEF SUMMARY OF THE INVENTION

It thus is the goal of the present invention to create a holder for a disk-shaped information carrier presenting a low height and at the same time ensuring excellent clamping action. A further goal of the present invention is seen in that a plate-shaped support member is to be created which is applicable with book covers of various thicknesses and which can be manufactured cost-efficiently.

This goal is achieved using a holder and support member as described in detail below and presented in the claims.

By providing a central support rigidly connected to the base forming the support member for the CD on one hand stable take-up is provided for the central circular opening of the CD and on the other hand a slightly elastic linking of the clamping element is achieved. This enhances the mechanical stability of the inventive holder. The clamping elements preferentially are designed in cuboidal shape in such a manner that enhanced friction of the surface co-operating with the inside rim of the circular opening of the CD is ensured any rotation of the CD on the holder thus being suppressed. Furthermore it has proven advantageous if the clamping elements on their outer face are provided with a shallow groove in such a manner that the inner rim of the circular opening is surroundingly gripped slightly by the clamping elements. In order to ensure simple insertion of the CD cuboid clamping elements are slightly beveled off at the edge of their free ends.

The plate-shaped support member is very easily manufactured. After a circular opening is stamped out in the book cover the support member merely is to be pressed into this opening which can be effected very rapidly using a suitable pressing device. The support member can be pressed in in such a manner that its upper face is flush with the upper face side of the take-up member, or of the book cover respectively. This flush arrangement does not depend on the thickness ratio of the book cover and of the support member. The only condition is that the thickness of the support member is smaller than the one of the book cover.

Smooth transition without any gaps is achieved if the support member is provided with a radially protruding flange which is pressed flush into the outer side of the cardboard take-up member. The support member preferentially is made from a suitable synthetic material using an injection molding method.

Further advantages of the present invention are described in the dependent claims and in the following description in which the present invention is explained in more detail with reference to a design example shown in the schematic drawings.

BRIEF DESCRIPTION OF THE DRAWINGS

FIG. 4 a top view of a disk-shaped support member with a holder according to the FIG. 1, FIG. 5 a cross-section of the support member along the line V—V according to the FIG. 4, FIG. 6 a top view of a second design example of the inventive holder, FIG. 7 an axonometric view of the second design example of the holder according to the FIG. 6, FIG. 8 a top view of a support member pressed into a take-up member, FIG. 9 a cross-section along the line IX—IX according to the FIG. 8, and in the FIGS. 10 and 11 schematically the process of insertion of the support member into the take-up member.

DETAILED DESCRIPTION OF THE INVENTION

Figure 1:
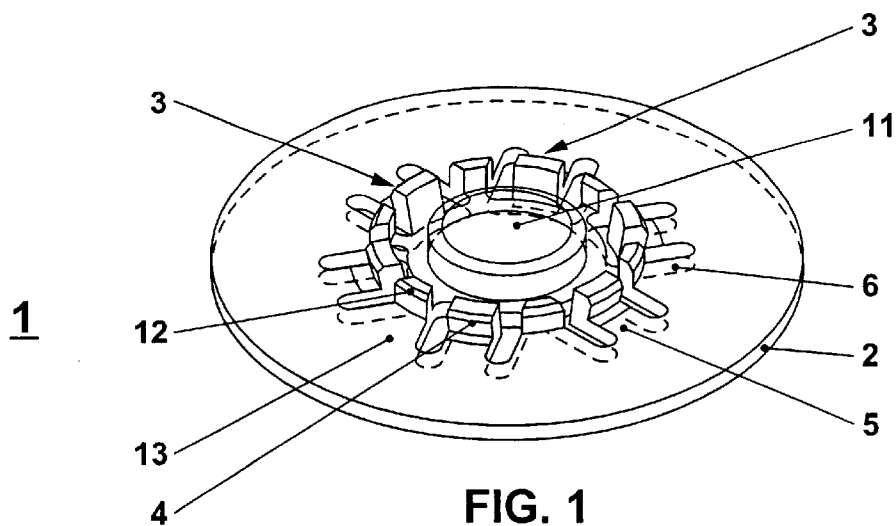
FIG. 1 an axonometric view of a first design example of the inventive holder.
Figure 2:
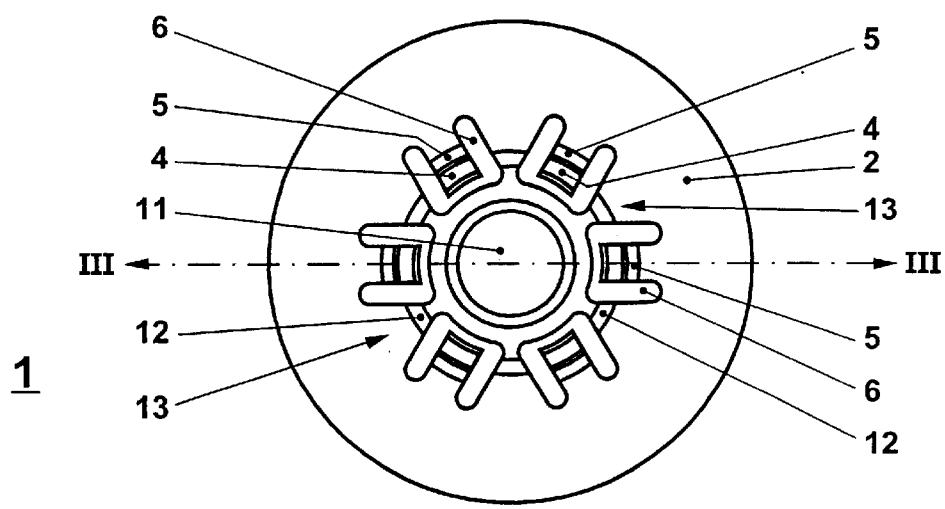
FIG. 2 a top view of the holder according to the FIG. 1.
Figure 3:
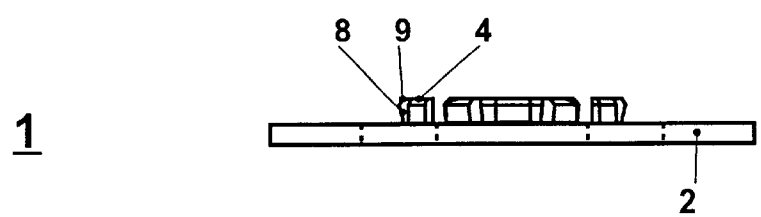
FIG. 3 a cross-section along line III—III according to the FIG. 2.

In the FIG. 1, a first design example is shown of a holder 1 for disk-shaped information carriers, in particular for compact disks (CD) which is provided with a support 2 designed as a disk and with a number of clamping elements 3. The clamping elements 3 engage the central opening of the CD (not shown) in a manner known as such in order to hold it tight. As can be seen from the FIG. 1 the clamping elements 3 are laid out as cuboid small posts 4 which are formed in one piece to form an L-shaped tongue 5 and which are mutually separated by U-shaped cut-outs 6 provided in the support 2. The tongue 5 thus is linked with one end to the support 2 and under vertically applied pressure can move slightly towards the inside of the holder—as in the existing CD holding devices known as such. As shown in the FIG. 1, and still more clearly in the FIG. 3, the post 4 on its outer side is slightly undercut in such a manner that its outer wall 8 is inclined outward slightly and its top edge presents a slightly beveled portion 9. Instead of an inclination of the wall 8 a shallow groove (not shown in more detail here) can be provided. As can be seen from the FIGS. 1 through 3 the clamping elements 3 are arranged evenly spaced mutually about a central support member 11 which here is laid out as a solid circular protrusion, or as a circular disk respectively. Between the individual clamping elements or tongues 5 furthermore centering elements 12 are formed as a unit with the support 2 protruding from the cross-member bridges 13 which connect the central support member 11 with the support 2. These centering elements 12 are of trapezoidal shape and are arranged in a circle the diameter of which corresponds to the diameter of the central opening of the CD and thus can serve for centering the CD to be taken up.

The posts 4 of the clamping elements 3 and the circular disk 11 with respect to the support 2 present a height which corresponds to not more than two times the thickness of the CD. In practical use the thickness of the CD is about 1 mm and the height of the posts 4 and of the circular disk 11 above the support 2 is about 1.6 mm. Thus the clamping elements 3 and the central support member 11 just insignificantly exceed the top surface of the CD in height, and thus the inventive holder described here is ideally suited for taking up CDs accompanying books, brochures or similar publications as enclosures. The lower side of the support 2 in known manner can be provided with adhesive foil for attaching it to the inside of a book cover or similar.

In another design example as shown in the FIG. 4 the holder 1 is provided on a disk-shaped support member 15 which can be pressed into a circular recess in a book cover as described in more detail in the following with reference to the FIGS. 8 through 11.

In the FIGS. 6 and 7 a second design example of the holder 1 is shown which in this case is formed by five cuboid posts 17 which are equally spaced mutually and are arranged at a small distance from a central support, or a solid circular disk 18 respectively. On the outer walls of the posts 17 each a rectangular recess 20 is provided in the base 21 of the support member 15. In this arrangement the posts 17 are provided with a minimum lever action movability. Seen in the axonometric view according to the FIG. 7 the arrangement of the posts 17 in relation to the circular disk 18 is illustrated more clearly still. The posts 17 in this arrangement are slightly inclined towards the outside in such a manner that the posts acting as clamping elements engage the inside rim of the central opening of the CD which they slightly surround. Also in this design example the heights of the posts 17 and of the central circular disk 18 is not higher than twice the thickness of the CD. The posts 17 also can be slightly undercut on their outer side, i.e. can be inclined slightly towards the outside or can be provided also with a shallow groove. Also the outer surfaces 19 of the posts 17 can be slightly roughened in order to prevent rotation of the CD held on the holder 1.

The holder 1, and the support member 15 respectively, described above are made from a suitable synthetic material, preferentially from polystyrene, and manufactured using an injection molding process. Of course other materials also can prove to be suitable, e.g. materials made from China grass as produced according to a manufacturing method by the NAPAC AG company.

The expert in the field of course will have noticed that also different variants of the design examples described above are feasible. In such arrangements e.g. the solid circular disks 11 and 18 can be designed in annular shape in order to ensure the stiffness required.

Figure 8:
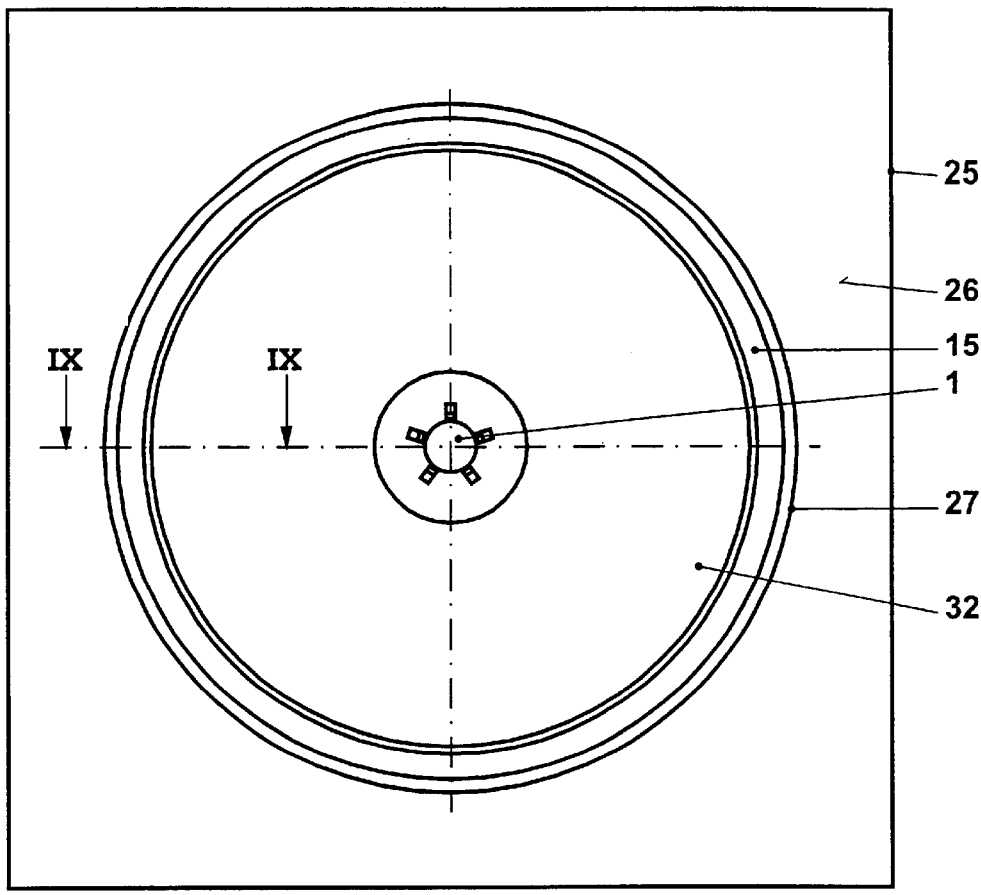

In the FIG. 8 a top view of the support member 15 is shown which is pressed into a take-up member 25. The take-up member can be e.g. a book cover laid out preferentially as a cardboard cut-out of 3 to 5 mm thickness. A circular recess 27 is sunk into the front side 26 of the take-up member 25, the recess preferentially extending throughout the whole thickness. The opening 27 can be produced e.g. in a stamping process. As shown in the FIG. 9 a relatively thin back wall 28 is present in the take-up member 25 below the opening 27. The through opening 27 also could be covered by a foil.

The support member 15 is laid out as a disk with a circular rim 30. In a recess 31 the holder 1 described above is arranged centrally which engages a central opening of an information carrier or of a compact disk 32 detachably connecting the latter to the support member 15. The holder 1 ensures that the support member 15 together with the CD 32 taken up does not, or insignificantly merely, protrude above the surface of the take-up member 25 laid out as a book cover.

Figure 9:
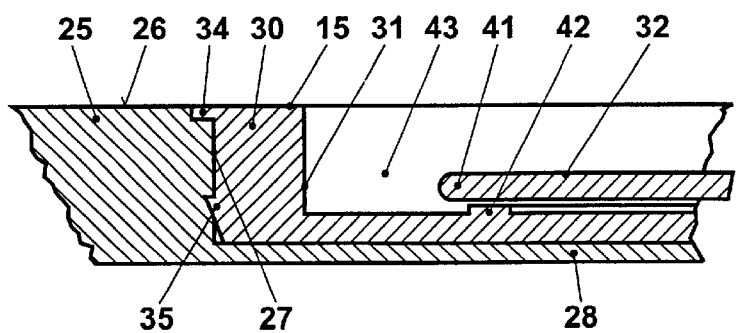
Figure 10:
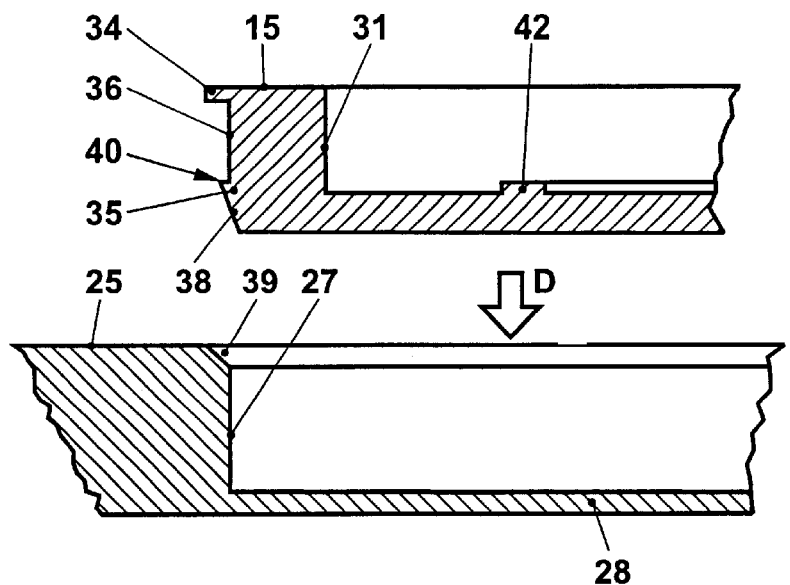

As shown in the FIG. 9 a flange 34 as well as a rib 35 are formed onto the circular rim 30 of the support member 15. The flange 34 as well as the rib 35 extend around the whole circumference but can be designed also extending over sectional portions thereof merely. The support member 15 is pressed into the opening 27 of the take-up member 25 as illustrated in the FIGS. 10 and 11. The rim 30 on its outer side is provided with a recess 36 extending over the whole circumference the outside diameter of which substantially corresponds to the inside diameter of the opening 27. The flange 34 and the rib 35 slightly exceed the outside diameter of the recess 36 the flange 34 protruding further than the rib 35. In order to mount the support member 15 into the take-up member 25 the support member according to the FIG. 10 is placed in the direction of the arrow D onto the opening 27 in which phase a lower tapered surface 38 centers the support member 15 in the opening 27. The opening 27 furthermore comprises a funnel-type enlargement 39 which co-operates with the surface 38.

Figure 11:
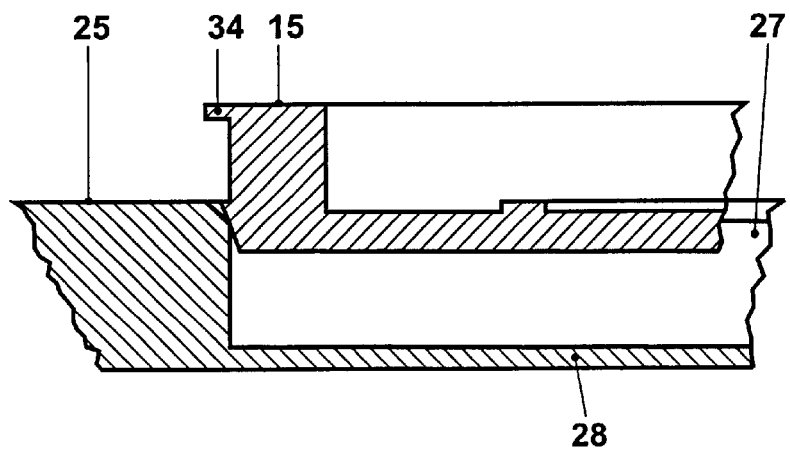

The support member 15 can be brought into the position shown in the FIG. 11 no exertion force being exerted. In order to insert the support member deeper into the opening a force must be applied, which can be exerted by a suitable press. As the support member 15 is moved beyond its position shown in the FIG. 11 the rib 35 with its sharp edge 40 is pushed into the opening 27. This movement continues until the support member 15 contacts the back wall 28 (compare the FIG. 9) and the flange 34 is flush with the front surface 26 of the take-up member 25. The flange 34 in the process slightly deforms the take-up member 25 in the zone next to the enlargement 39. The rib 3 with its sharp edge 40 engages the take-up member 25 and thus acts as a retaining element in order to prevent any lifting off of the support member 15. The retaining effect should be at least sufficient in order to ensure that the information carrier or the compact disk 32 can be gripped at its rim 41 and be lifted off the holder 1 without lifting the support member 15 off the take-up member or book cover 25. As shown in the FIG. 9 the CD rim 41 rests on a rib 42 of the support member 15 and slightly exceeds the diameter of the rib. If this rib 42 is interrupted in several places along the circumference, the CD 32 can be gripped more easily. Between the rim 41 and the support member 15 a gap 43 prevails which makes reaching in and gripping the rim 41 of the CD 32 feasible.

As mentioned before a combination of the support member 15 and the take-up member 25 as a book cover is envisaged. The opening 27 in this arrangement can be provided on the inside of the book cover as well as on its outside.

The method of producing a book cover 25 with an incorporated CD-support member 15 comprises the following steps:

On a machine equipped with a carousel for taking up books or book covers a book cover or a complete book at an insertion station is manually placed into a take-up device. The take-up device is equipped with a movable frame which can be fixed at a determined position. For a given book cover 25 or for a given book the correct positioning of the frame is effected once only. Thereafter the carousel is rotated using a motor drive to a centering station in which the take-up device is centered with respect to the opening 27. Thereafter the carousel is rotated to a further station at which a paper cover is stamped over the opening 27 of the book cover 25. In a gluing station then adhesive is sprayed onto the bottom of the opening 27 using adhesive spay cans. In a press station the funnel-shaped enlargement or beveled edge 39 subsequently is formed with the help of a stamping tool. At a further station then the CD-support member 15 is inserted and with the help of a press or a stamping tool is pressed into the book cover. Upon further rotation of the carousel to a delivery station the CD is placed onto the holder 1. Finally the completed book cover or the completed book is manually taken off the delivery station and readied for shipping. The machine described above thus comprises eight stations and eight take-up devices for book covers or whole books. The use of a machine of this type renders the manufacturing process very efficient and cost effective.

LIST OF REFERENCE NUMBERS 1 holder
2 support base
3 clamping element
4 cuboid post
5 L-shaped tongue
6 U-shaped cut-out
7
8 outer wall
9 bevelled edge
10
11 central support member
12 centring element
13 cross-member bridge
14
15 disk shaped support member
16
17 cuboid post
18 central support member, circular disk
19 outer wall
20 rectangular opening
21 support base
22
23
24
25 take-up member, book cover
26 front side surface
27 circular opening
28 back wall
29
30 circular rim
31 recess
32 information carrier
33
34 flange
35 rid
36 circular recess
37
38 tapered surface
39 funnel-shaped enlargement
40 sharp edge
41 rim
42 rib
43 gap

What is claimed is:

1. A holder device for receiving and retaining a disk-shaped information carrier with a central circular opening, said device comprising:
   a base support;
   a central solid circular support member protruding from said base support;
   a plurality of clamping elements mounted integrally on and protruding from said base support for penetrating said central opening of the disk-shaped information carrier, said clamping elements having outer walls and being arranged surrounding said central circular support member, each of said clamping elements being separated from said central circular support member by a U-shaped cut-out;
   a plurality of centering elements, each centering element being disposed between two clamping elements; and
   said support member and said clamping elements having a height from said base support not exceeding twice the thickness of said disk-shaped information carrier.

2. A holder device according to claim 1, wherein said clamping elements are of rectangular parallelepiped form.

3. A holder device according to claim 1, wherein said outer walls of clamping elements further comprise a shallow groove.

4. A holder device according to claim 1, wherein said outer walls of clamping elements are inclined outwardly.

5. A holder device according to claim 2, wherein said outer walls of said clamping elements further have a beveled edge.

6. A holder device according to claim 2, wherein rectangular cut-out elements are provided in the base support and in proximity to said clamping elements and distant from said support member.

7. A holder device according to claim 1, wherein said clamping elements further comprise L-shaped tongues linked to said base support and U-shaped cut-out elements adjacent are provided in the base support and surrounding said clamping elements.

8. A holder device according to claim 7, wherein rigid bridges are provided between said L-shaped tongues, and wherein each of said bridges comprises a trapezoidal centering elements rigidly connected to said base support, and said centering elements and said tongues being arranged in a circle surrounding said central support member.

9. A holder device according to claim 1, wherein said central support member is provided as a circular cylindrical protrusion.

10. A holder device according to claim 9, wherein said cylindrical protrusion is provided as a solid body.

11. A plate-shaped support member for a disk-shaped information carrier comprising:
- a recess with a holder device for receiving and retaining said information carrier, said holder device having a plurality of clamping elements penetrating a central opening of said information carrier;
- said support member having a circular shape and being adapted for connection to a plate-shaped take-up member presenting a front side and a back side, said take-up member having a circular opening for receiving and retaining said plate-shaped support member;
- an outer rim provided with retaining means adapted to engage the inner wall of circular opening of said take-up member in order to interconnect said support member with said receiving member; wherein
- the height of said plate-shaped support member corresponds generally to the height of the inner wall of said circular opening.

12. A support member according to claim 11, wherein said outer rim is provided with a radially protruding flange adapted for pressing into said take-up member, in order to provide a flush relationship between said outer rim and said outer side of said take-up member.

13. Support member according to claim 11, wherein said retaining means of said outer rim comprises a rib extending circumferentially from said support member and provided with a sharp edge adapted for pressing into said take-up member.

* * * * *